United States Patent
Miyata

(10) Patent No.: US 7,483,361 B2
(45) Date of Patent: Jan. 27, 2009

(54) OPTICAL DISC APPARATUS

(75) Inventor: Masaaki Miyata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 593 days.

(21) Appl. No.: 11/312,590

(22) Filed: Dec. 21, 2005

(65) Prior Publication Data
US 2006/0133242 A1 Jun. 22, 2006

(30) Foreign Application Priority Data
Dec. 21, 2004 (JP) ............. P.2004-370127

(51) Int. Cl.
*G11B 20/10* (2006.01)
(52) U.S. Cl. .............. 369/124.12; 369/59.15; 369/47.25
(58) Field of Classification Search ......... 369/44.17, 369/47.25, 47.26, 59.15, 59.16, 124.1–124.13
See application file for complete search history.

(56) References Cited

U.S. PATENT DOCUMENTS 5,703,852 A * 12/1997 Kumagai ............. 369/53.3
6,680,887 B2 * 1/2004 Shihara et al. ......... 369/59.19
6,747,924 B1 * 6/2004 Muramatsu ............ 369/47.17
6,999,388 B2 * 2/2006 Mashimo et al. ....... 369/47.25
7,215,613 B2 * 5/2007 Wada .................. 369/47.26

FOREIGN PATENT DOCUMENTS

| JP | A-2002-008243 | 1/2002 |
| JP | A-2002-074845 | 3/2002 |
| JP | A-2004-227697 | 8/2004 |

* cited by examiner

*Primary Examiner*—Thang V Tran
(74) *Attorney, Agent, or Firm*—Morgan, Lewis & Bockius LLP

(57) ABSTRACT

An optical disc apparatus includes: a read unit for outputting an RF signal, which is a read signal of data recorded in an optical disc, by irradiating a laser beam to the optical disc and detecting reflected light in a photo detector; an equalize unit for performing equalize adjustment on the RF signal, which is an output from the read unit; a playback unit for generating a playback signal from the RF signal having undergone the equalize adjustment by the equalize unit and outputting the playback signal; a parameter storage unit for storing initial values of parameters used for the equalize adjustment by the equalize unit; and a parameter detection unit for detecting a value of at least one parameter at which jitter of the RF signal having undergone the equalize adjustment by the equalize unit becomes optimal during playback of the optical disc.

5 Claims, 4 Drawing Sheets

OPTICAL DISC APPARATUS

BACKGROUND OF THE INVENTION

1. Field of the Invention

The present invention relates to an optical disc apparatus that plays back data recorded in an optical disc, such as a DVD and a CD, set in the main body.

2. Description of the Related Art

An optical disc apparatus in the related art that plays back data recorded in an optical disc, such as a DVD and a CD, has been in widespread use. As is known, the optical disc apparatus is provided with a pickup head that reads data recorded in the optical disc set in the main body by irradiating a laser beam to the optical disc and detecting reflected light in a photo detector. The pickup head outputs an RF signal, which is a read signal of data recorded in the optical disc. The RF signal outputted from the pickup head contains various frequency components and the level becomes lower for higher frequencies. Also, jitter becomes worse for signals at lower levels. In order to optimize the jitter, a typical optical disc apparatus performs equalize adjustment on the RF signal, which is an output from the pickup head. The equalize adjustment is the processing to cut off components at frequencies higher than a given frequency from the RF signal read from the optical disc as well as to boost the RF signal. Because the data recorded in the optical disc is in the digital form, the jitter can be suppressed sufficiently even when the cutoff frequency of the RF signal for the equalize adjustment is set to a fixed value. However, because abort amount varies considerably with the recording density of data, the signal quality, etc. of the optical disc to be played (the optical disc set in the main body), it has to be set for each individual optical disc set in the main body.

An optical disc apparatus that sets both the cutoff frequency and a boost amount for each individual optical disc set in the main body has been also in widespread use.

The optical disc apparatus in the related art detects the cutoff frequency and a boost amount of an RF signal at which the jitter becomes optimal for an optical disc set in the main body prior to the playback, and then starts the playback of the optical disc. For the playback of the optical disc, the equalize adjustment is performed on the basis of the cutoff frequency and the boost amount detected at this point. Because parameters (the cutoff frequency and a boost amount) used for the equalize adjustment are detected prior to the playback as has been described, the playback of the optical disc is delayed by a time needed to detect these parameters. To solve this problem, JP-A-2004-227697, JP-A-2002-8243 and JP-A-2002-74845 propose methods for shortening the time needed to detect the cutoff frequency and a boost amount used for the equalize adjustment that is performed prior to the playback.

For example, JP-A-2004-227697 proposes a method as follows on the ground that the cutoff frequency is proportional to the rotational velocity of the optical disc whereas a boost amount hardly varies with respect to the rotational velocity of the optical disc. That is, the cutoff frequency and a boost amount at which the jitter becomes optimal are detected before the rotational velocity of the optical disc reaches the rotational velocity during playback. Then, an optimal cutoff frequency at the rotational velocity during playback is computed on the basis of the cutoff frequency detected at this point and the rotational velocity of the optical disc when this cutoff frequency was detected. For a boost amount, the detected boost amount is used intact.

Also, JP-A-2002-8243 proposes a method for making the processing to detect the cutoff frequency and a boost amount of the RF signal simpler to shorten the time needed for this processing. To be more concrete, a boost amount at which the jitter reaches minimal is detected by varying a boost amount while fixing the cutoff frequency. Then, the cutoff frequency at which the jitter reaches minimal is detected by varying the cutoff frequency while fixing a boost amount to the value detected just before. Finally, a boost amount at which the jitter reaches minimal is detected by varying a boost amount while fixing the cutoff frequency to the value determined just before.

Also, JP-A-2002-74845 proposes a method as follows. That is, initial values of the cutoff frequency and a boost amount have been stored previously, and a boost amount at which the jitter reaches minimal is determined by reducing a boost amount from the initial value step by step by a certain quantity while fixing the cutoff frequency to the initial value.

SUMMARY OF THE INVENTION

The optical disc apparatus in the related art merely determines the cutoff frequency and a boost amount used for the equalize adjustment prior to the playback. However, a boost amount at which the jitter reaches minimal varies with a playback position (inner periphery and outer periphery) of the optical disc. In particular, in WORM (write once, read many) and re-writable optical discs (hereinafter, collectively referred to as the recording optical disc), a boost amount at which the jitter reaches minimal differs in every recorded content unit because the environment (ambient temperature, laser power, etc.) at the time of recording differs in every recorded content unit. Hence, the configuration to perform the equalize adjustment using a boost amount determined prior to the playback as with the optical disc apparatus in the related art has a problem that optimal equalize adjustment cannot be performed due to a change of the playback position and a change of the contents.

An object of the invention is therefore to provide an optical disc apparatus capable of performing equalize adjustment constantly in an appropriate manner during playback of an optical disc without being influenced by a change of the playback position and a change of the contents of the optical disc.

In order to achieve the above and other objects, an optical disc apparatus of the invention is configured as follows.

According to a first aspect of the invention, there is provided an optical disc apparatus includes: a read unit for outputting an RF signal, which is a read signal of data recorded in an optical disc set in a main body, by irradiating a laser beam to the optical disc and detecting reflected light in a photo detector; an equalize unit for performing equalize adjustment on the RF signal, which is an output from the read unit; a playback unit for generating a playback signal from the RF signal having undergone the equalize adjustment by the equalize unit and outputting the playback signal; parameter storage unit for storing initial values of parameters used for the equalize adjustment by the equalize unit; and parameter detection unit for detecting a value of at least one parameter at which jitter of the RF signal having undergone the equalize adjustment by the equalize unit becomes optimal during playback of the optical disc set in the main body, wherein: the equalize unit performs the equalize adjustment using the initial values stored in the parameter storage unit at a beginning of playback of the optical disc set in the main body, and thereafter performs the equalize adjustment each time the parameter detection unit detects a value of the parameter at which the jitter of the RF signal having undergone the equalized adjustment becomes optimal by using the detected value of the parameter.

When configured in this manner, the equalize unit performs the equalize adjustment using the initial values stored in the parameter storage unit at the beginning of the playback of the optical disc. The parameter storage unit has stored the initial values of the cutoff frequency and a boost amount. As has been described, because the playback of the optical disc is started without performing the processing to determine parameters to be used for the equalize adjustment, the time needed to start the playback can be shorter, and the ease of use for the user can be enhanced.

Also, the parameter detection unit detects at least one parameter at which the jitter becomes optimal during playback of the optical disc, and the equalize unit performs the equalize adjustment using the parameter thus detected. It is thus possible to perform the equalize adjustment constantly using the optimal parameter without being influenced by a change of the playback position or a change of the contents of the optical disc.

According to a second aspect of the invention, the parameter detection unit detects a boost amount at which the jitter of the RF signal having undergone the equalize adjustment becomes optimal.

When configured in this manner, only a boost amount at which the jitter becomes optimal is detected while fixing the cutoff frequency. It is thus possible to suppress the processing load on the apparatus main body during playback.

This configuration does not raise a problem, because the data recorded in the optical disc is in the digital form and the jitter can be therefore suppressed sufficiently even when the cutoff frequency of the RF signal for the equalize adjustment is set to a fixed value.

According to a third aspect of the invention, the parameter detection unit performs the equalize adjustment using three boost amounts, including a boost amount used for the equalize adjustment at this point in time, a boost amount larger than the firstly-mentioned boost amount by a specific amount, and a boost amount smaller than the firstly-mentioned boost amount by the certain amount, and detects the boost amount at which the jitter reaches minimal as the boost amount to be used for the equalize adjustment.

When configured in this manner, a boost amount at which the jitter reaches minimal is detected among three boost amounts, including a current boost amount, a boost amount larger than the current boost amount by a specific amount, and a boost amount smaller than the current boost amount by the specific amount, as a boost amount to be used for the equalize adjustment. Because the boost amount to be used for the equalize adjustment can be detected by simple processing as above, processing load on the apparatus main body during playback can be suppressed sufficiently.

According to a fourth aspect of the invention, the parameter detection unit suspends processing to detect the boost amount to be used for the equalize adjustment when the detected boost amount to be used for the equalize adjustment is equal to the boost amount that is used for the equalize adjustment at this point in time, and resumes processing to detect a boost amount at which the jitter of the RF signal having undergone the equalize adjustment becomes optimal immediately after the playback of the optical disc starts or contents being played back are switched.

When configured in this manner, when the boost amount detected as the one at which the jitter reaches minimal is equal to the current boost amount, a boost amount at which the jitter becomes optimal is already detected at this point in time.

Hence, by suspending the processing to detect a boost amount to be used for the equalize adjustment, it is possible to further suppress the processing load on the apparatus main body during playback. In addition, the processing to detect a boost amount at which the jitter of the RF signal having undergone the equalize adjustment becomes optimal is resumed immediately after the playback starts or the contents being played back are switched. It is thus possible to perform the optimal equalize adjustment without being influenced by a change of the contents being played back.

According to the invention, because the playback of the optical disc is started without performing the processing to determine the parameters to be used for the equalize adjustment, the time needed to start the playback can be shorter, and the ease of use for the user can be enhanced. Also, a parameter at which the jitter becomes optimal is detected during playback of the optical disc, and the equalize adjustment is performed using the parameter thus detected. It is thus possible to perform the equalize adjustment constantly using the optimal parameter without being influenced by a change of the playback position or a change of the contents of the optical disc.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, an optical disc apparatus as one embodiment of the invention will be described.

Figure 1:
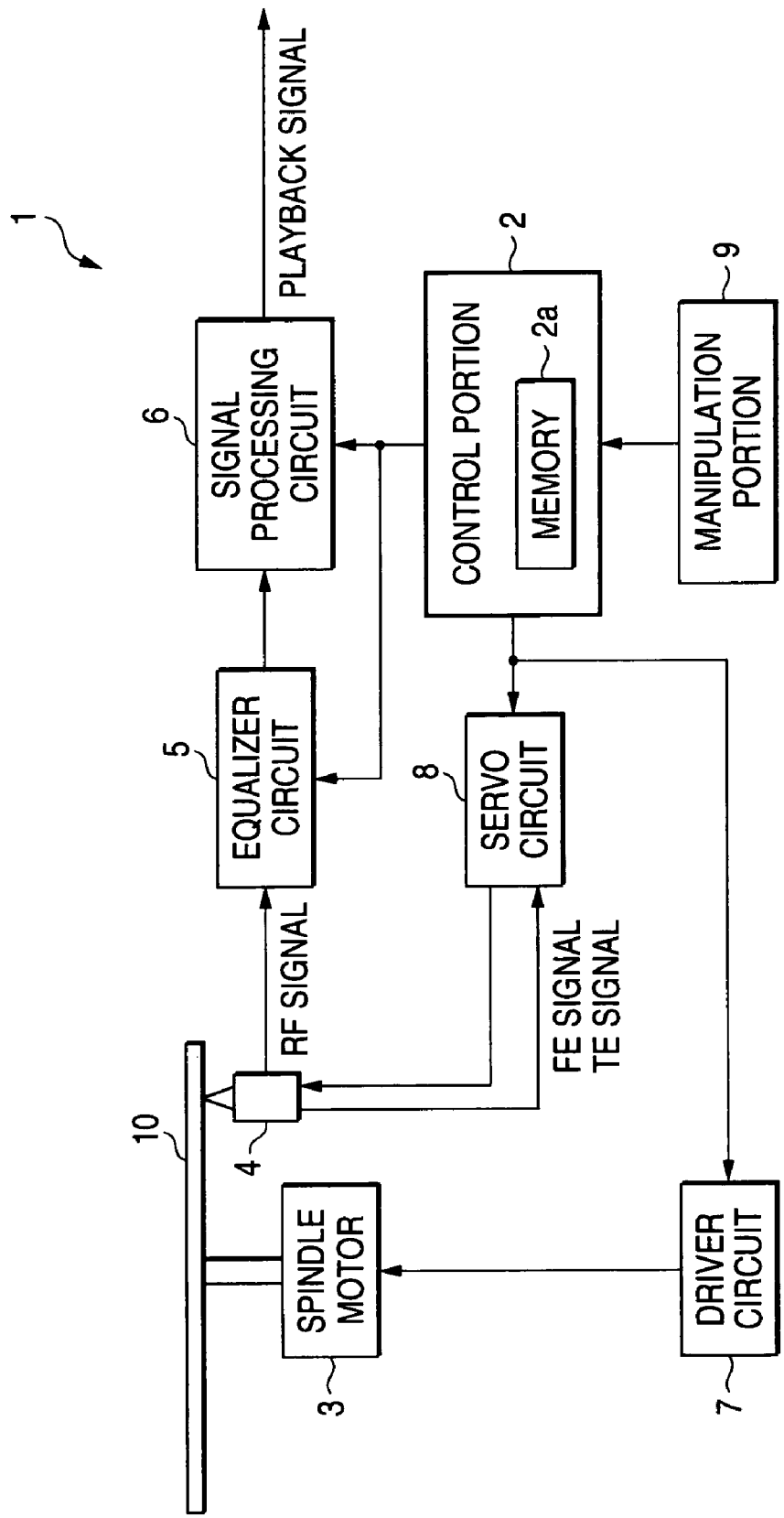
FIG. 1 is a block diagram showing the configuration of a major portion of an optical disc apparatus as one embodiment of the invention.

FIG. 1 is a block diagram showing the configuration of a major portion of an optical disc apparatus as one embodiment of the invention. The optical disk apparatus 1 of this embodiment includes: a control portion 2 that controls operations of the main body; a spindle motor 3 that rotates an optical disc 10, such as a CD or a DVD, set in the main body; a pickup head 4 that outputs an RF signal by irradiating a laser beam to the optical disc 10 set in the main body and receiving reflected light therefrom; an equalizer circuit 5 that adjusts the frequency characteristic of the RF signal outputted from the pickup head 4; and a signal processing circuit 6 that generates a playback signal (audio signal and video signal) from the RF signal whose frequency characteristic has been adjusted in the equalizer circuit 5 and outputs the playback signal. Numeral 7 denotes a driver circuit that controls rotations of the spindle motor 3. Numeral 8 denotes a servo circuit that performs focus servo control to move an objective lens (not shown) provided to the pickup head 4 in directions to come closer to and move away from the optical disc 10 and tracking servo control to move the objective lens in the radius direction of the optical disc 10. Numeral 9 denotes a manipulation portion for the user to perform input manipulations.

The pickup head 4 is equivalent to a read unit of the invention. As is known, the pickup head 4 is provided with a four-part split photo detector (PD) to obtain a focus error signal (FE signal) and a tracking error signal (TE signal). The FE signal is a signal indicating a shift length between the recording surface of the optical disc 10 and the focusing position of a laser beam, and the TE signal is a signal indicating a shift length between the center of tracks on the optical disc 10 and the focusing position of a laser beam. The servo circuit 8 performs the focus servo control on the basis of the FE signal and performs the tracking servo control on the basis of the TE signal both inputted from the pickup head 4. The adjustment of the frequency characteristic of the RF signal outputted from the pickup head 4 performed in the equalizer circuit 5 is the processing to cut off components at frequencies higher than the pre-set cutoff frequency (Fc) and boost the RF signal according to the pre-set boost amount (Bt). The control portion 2 stores initial values of the cutoff frequency and a boost amount in a memory 2a. To be more concrete, a cutoff frequency and a boost amount at which the jitter reaches minimal during playback, which were measured with an optical disc having standard recording density and signal quality, are pre-stored in the memory 2a as the initial values. The optical disc apparatus 1 of this embodiment performs the equalize adjustment using the initial values of the cutoff frequency and a boost amount at the beginning of the playback, and detects later a boost amount at which the jitter reaches minimal while continuing the playback to perform equalize adjustment using the boost amount detected later. The cutoff frequency is fixed to the initial value. The processing to detect a boost amount will be described below.

The signal processing circuit 6 decodes the RF signal whose frequency characteristic has been adjusted in the equalizer circuit 5 while performing an error correction, and outputs decoded audio signal and video signal as a playback signal. The driver circuit 7 controls the rotational velocity of the optical disc 10 by controlling the rotational velocity of the spindle motor 3. The manipulation portion 7 is provided with manipulation keys for the user to perform input manipulations and a remote control reception portion that receives a control signal for the main body transmitted from an unillustrated remote controller device.

Figure 2:
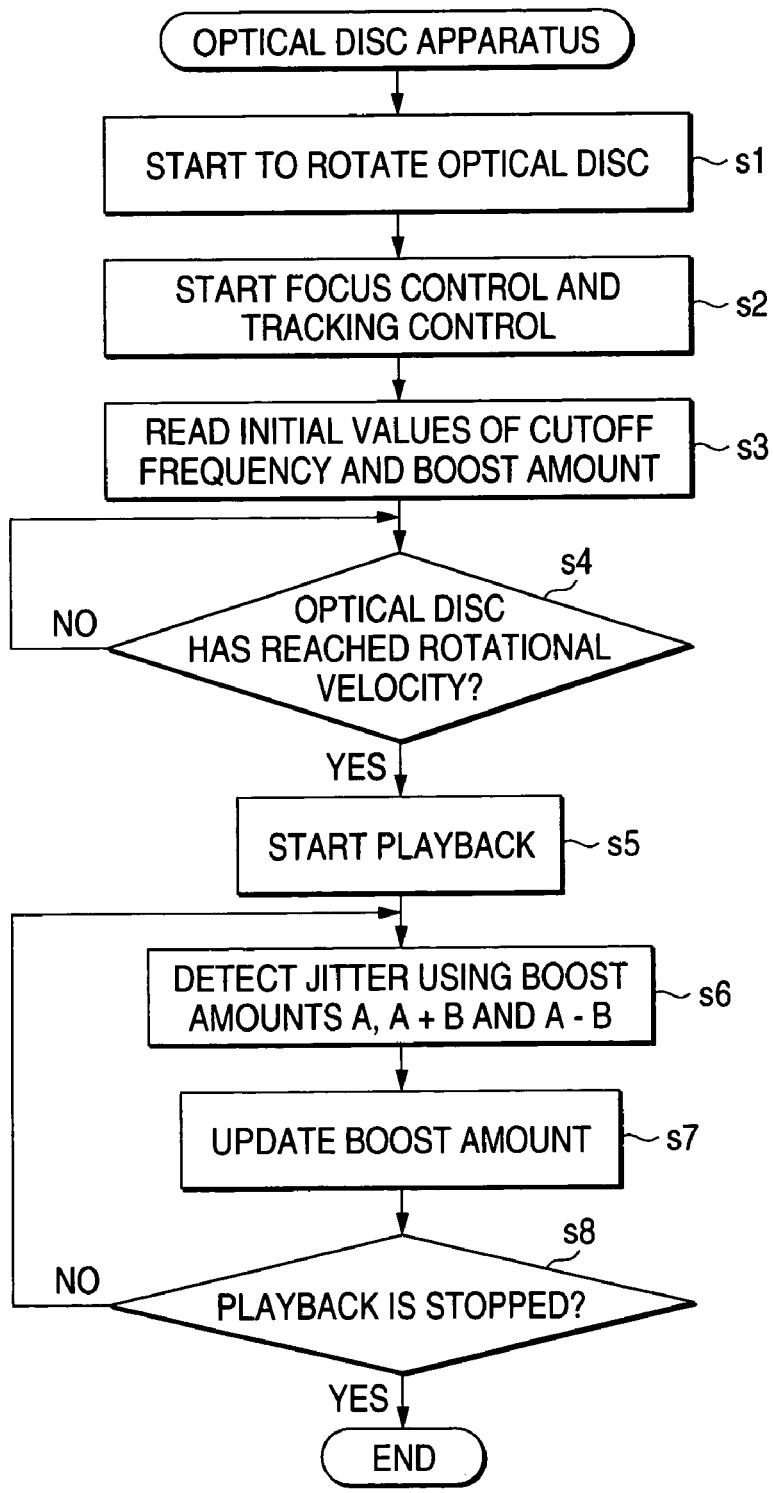
FIG. 2 is a flowchart detailing an operation of the optical disc apparatus as one embodiment of the invention during playback.

An operation of the optical disc apparatus 1 of this embodiment during playback of the optical disc 10 will now be described. FIG. 2 is a flowchart detailing the operation of the optical disc apparatus 1 as one embodiment of the invention during playback. Upon receipt of a command to start the playback, the optical disc apparatus 1 starts this processing. For example, the optical disc apparatus 1 starts this processing when a play key provided in the manipulation portion 9 is manipulated or when a command to start the playback transmitted from the unillustrated remote control device is received, or further when the optical disc 10 is set in the main body.

Figure 3:
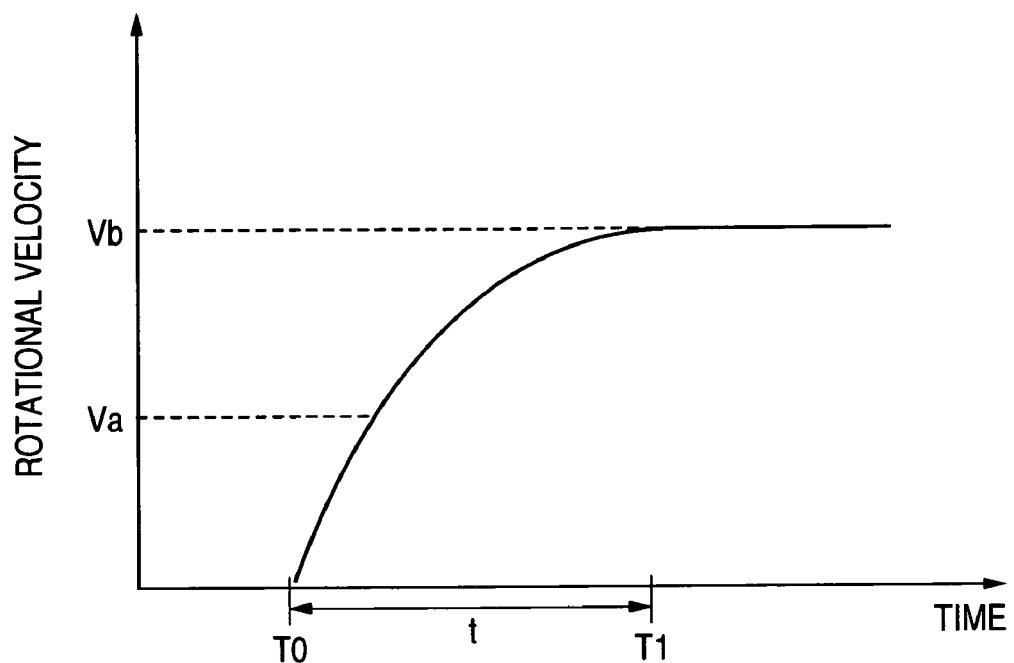
FIG. 3 is a view used to describe the control of a rotational velocity of an optical disc during playback.

Initially, the optical disc apparatus 1 starts to rotate the optical disc 10 set in the main body (starts to rotate the spindle motor 3) (s1). As is shown in FIG. 3, the rotational velocity of the optical disc 10 set in the main body reaches the pre-set rotational velocity (equivalent to a specific rotational velocity of the invention) after a time t has passed since the rotation started in s1. Referring to FIG. 3, T0 is the timing at which the optical disc 10 starts to rotate, and T1 is the timing at which the rotational velocity of the optical disc 10 reaches a specific rotational velocity Vb. Once the optical disc 10 set in the main body starts to rotate in s1, the optical disc apparatus 1 starts the focus control and the tracking control by means of the servo circuit 8 without waiting for the rotational velocity to reach the rotational velocity during playback (Vb) (s2). As is known, the focus control is the control to bring the focal position of a laser beam irradiated to the optical disc 10 into agreement with the data recording surface of the optical disc 10, and the tracking control is the control to bring the irradiation position of a laser beam irradiated to the optical disc 10 into agreement with the center of tracks on the optical disc 10. Because the focus control and the tracking control by the servo circuit 8 are known in detail, the description will be omitted herein.

Also, the optical disc apparatus 1 reads out the initial values of the cutoff frequency and a boost amount stored in the memory 2a (s3). The optical disc apparatus 1 waits until the rotational velocity (Va) of the optical disc 10 set in the main body reaches the optical velocity during playback (Vb), and then starts the playback (s4 and s5). In s5, the equalizer circuit 5 performs equalize adjustment on an RF signal inputted from the pickup head 4 using the initial values (the cutoff frequency and a boost amount) read from the memory 2a in s3. The RF signal having undergone the equalize adjustment in the equalizer circuit 5 is inputted into the signal processing circuit 6, and the signal processing circuit 6 generates and outputs a playback signal. The playback signal is inputted into an unillustrated TV receiver or the like. The TV receiver outputs videos and sounds according to the playback signal thus inputted.

Once the playback of the optical disc 10 set in the main body is started in s5, the optical disc apparatus 1 detects the jitter with each of the equalize adjustments respectively using a boost amount (A) currently used for the equalize adjustment in the equalizer circuit 5, a boost amount (A+B) larger than the current boost amount by a specific amount (B), and a boost amount (A−B) smaller than the current amount by the specific amount (B) (s6). The optical disc apparatus 1 updates the boost amount to a boost amount detected in s6 at which the jitter reaches minimal as a new boost amount to be used for the equalize adjustment in the equalizer circuit 5 (s7). The equalizer circuit 5 then performs equalize adjustment using the boost amount updated in s7. The optical disc apparatus 1 repeats the processing in s6 and s7 until the playback of the optical disc 10 is stopped (s8).

As has been described, the optical disc apparatus 1 of this embodiment is configured to perform the equalize adjustment in the equalizer circuit 5 using the cutoff frequency and the boost amount stored in the memory 2a at the beginning of the playback of the optical disc 10. It is thus possible to shorten the time needed to actually start the playback of the disc 10 since the user made an input manipulation to start the playback, which can enhance the ease of use for the user.

Once the playback of the optical disc 10 starts, a boost amount at which the jitter reaches minimal is repetitively detected until the playback is stopped. It is thus possible to perform the equalize adjustment constantly using the optimal parameter without being influenced by a change of the playback position and a change of the contents of the optical disc 10.

In this embodiment, the cutoff frequency used for the equalizer adjustment is fixed to the initial value. However, this will not raise a problem, because the data recorded in the optical disc is in the digital form and the jitter can be therefore suppressed sufficiently even when the cutoff frequency of the RF signal for the equalize adjustment is set to the fixed value (initial value). In addition, by omitting the processing to detect the cutoff frequency at which the jitter reaches the minimal, the load on the apparatus during playback can be suppressed, which can in turn prevent the playback operation from becoming destabilized.

Figure 4:
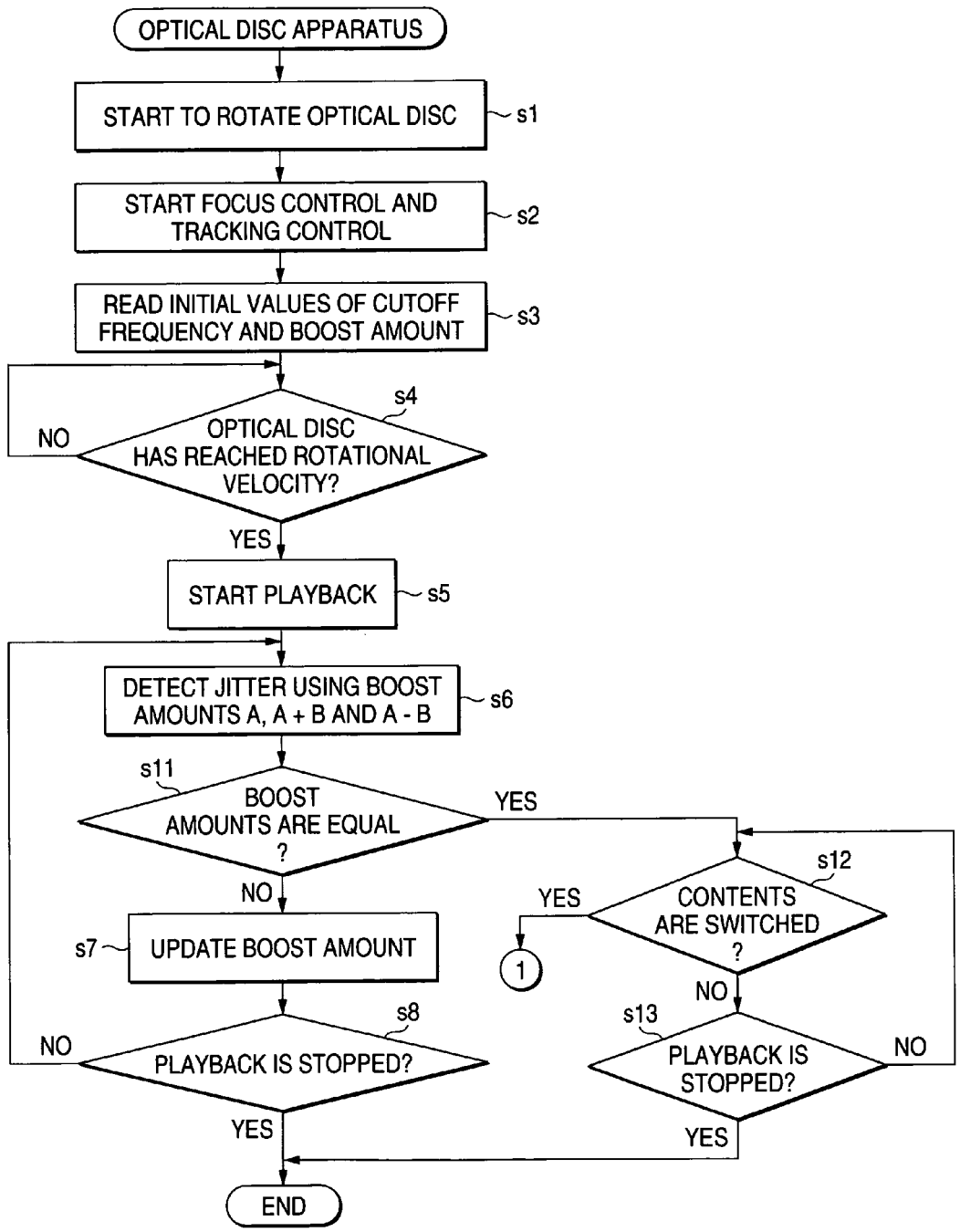
FIG. 4 is a flowchart detailing an operation of the optical disc apparatus as another embodiment of the invention during playback.

Another embodiment of the optical disc apparatus 1 of the invention will now be described. The optical disc apparatus 1 of this embodiment is also of the configuration shown in FIG. 1. FIG. 4 is a flowchart detailing the operation of the optical disc apparatus 1 as another embodiment of the invention during playback. As with the apparatus of the embodiment described above, the optical disc apparatus 1 of this embodiment performs processing in s1 through s6. The optical disc apparatus 1 of this embodiment judges whether the boost amount detected in s6 as the one at which the jitter reaches minimal is a boost amount (A) currently used for the equalize adjustment in the equalizer circuit 5 at this point in time (s11). Upon judging that the two boost amounts are not equal in s11, the optical disc apparatus 1 updates the boost amount to the boost amount detected in s6 as the one at which the jitter reaches the minimal as a new boost amount to be used for the equalize adjustment in the equalizer circuit 5 (s7). On the other hand, upon judging that two boost amounts are equal in s11, the optical disc apparatus 1 waits until the contents being played back are switched to other contents (s12) or the playback of the optical disc 10 is stopped (s13).

As has been described, the optical disc apparatus 1 of this embodiment judges that a boost amount being used in the equalizer circuit 5 at this point in time is converging upon judgment that the two boost amounts are equal in s11, and suspends the processing in s6 and s7. This further suppresses the load on the optical disc apparatus 1 during playback, and thereby prevents the playback operation from becoming destabilized in a more reliable manner.

In addition, upon judging that the contents are switched to the other contents in s12, the optical disc apparatus 1 returns to s6. As has been described, the processing to detect a boost amount at which the jitter of the RF signal that has undergone equalize adjustment becomes optimal is started immediately after the contents being played back are switched. It is thus possible to perform the optimal equalize adjustment without being influenced by a change of the contents being played back.

The optical disc apparatus 1 ends this processing upon judging that the playback of the optical disc 10 is stopped in s8 or s13.

FIG. 1
1: OPTICAL DISC APPARATUS
2: CONTROL PORTION
2a: MEMORY
3: SPINDLE MOTOR
5: EQUALIZER CIRCUIT
6: SIGNAL PROCESSING CIRCUIT
7: DRIVER CIRCUIT
8: SERVO CIRCUIT
9: MANIPULATION PORTION
101: PLAYBACK SIGNAL
102: RF SIGNAL
103: FE SIGNAL
104: TE SIGNAL

FIG. 2
s1: START TO ROTATE OPTICAL DISC
s2: START FOCUS CONTROL AND TRACKING CONTROL
s3: READ INITIAL VALUES OF CUTOFF FREQUENCY AND BOOST AMOUNT
s4: OPTICAL DISC HAS REACHED ROTATIONAL VELOCITY
s5: START PLAYBACK
s6: DETECT JITTER USING BOOST AMOUNTS A, A+B, AND A−B
s7: UPDATE BOOST AMOUNT
s8: PLAYBACK IS STOPPED

FIG. 4
s1: START TO ROTATE OPTICAL DISC
s2: START FOCUS CONTROL AND TRACKING CONTROL
s3: READ INITIAL VALUES OF CUTOFF FREQUENCY AND BOOST AMOUNT
s4: OPTICAL DISC HAS REACHED ROTATIONAL VELOCITY
s5: START PLAYBACK
s6: DETECT JITTER USING BOOST AMOUNTS A, A+B, AND A−B
s11: BOOST AMOUNTS ARE EQUAL
s7: UPDATE BOOST AMOUNT
s8: PLAYBACK IS STOPPED
s12: CONTENTS ARE SWITCHED
s13: PLAYBACK IS STOPPED

What is claimed is:

1. An optical disc apparatus comprising:
a read unit for outputting an RF signal, which is a read signal of data recorded in an optical disc set in a main body, by irradiating a laser beam to the optical disc and detecting reflected light in a photo detector;
an equalize unit for performing equalize adjustment on the RF signal, which is an output from the read unit;
a playback unit for generating a playback signal from the RF signal having undergone the equalize adjustment by the equalize unit and outputting the playback signal;
a parameter storage unit for storing an initial value of a boost amount used for the equalize adjustment by the equalize unit; and
a parameter detection unit for detecting a value of the boost amount at which jitter of the RF signal having undergone the equalize adjustment by the equalize unit becomes optimal during playback of the optical disc set in the main body, wherein:
the equalize unit performs the equalize adjustment using the initial value stored in the parameter storage unit at a beginning of the playback of the optical disc set in the main body, and thereafter performs the equalize adjustment each time the parameter detection unit detects a value of the boost amount at which the jitter of the RF signal having undergone the equalized adjustment becomes optimal by using the detected value of the boost amount;
the parameter detection unit performs the equalize adjustment using three boost amounts, including a boost amount used for the equalize adjustment at this point in time, a boost amount larger than the firstly-mentioned boost amount by a specific amount, and a boost amount smaller than the firstly-mentioned boost amount by a certain amount, and detects the boost amount at which the jitter reaches minimal as a boost amount to be used for the equalize adjustment; and
the parameter detection unit suspends processing to detect the boost amount to be used for the equalize adjustment when the detected boost amount to be used for the equalize adjustment is equal to the boost amount that is used for the equalize adjustment at this point in time, and resumes the processing to detect a boost amount at which the jitter of the RF signal having undergone the equalize adjustment becomes optimal immediately after the playback of the optical disc starts or contents being played back are switched.

2. An optical disc apparatus comprising:

a read unit for outputting an RF signal, which is a read signal of data recorded in an optical disc set in a main body, by irradiating a laser beam to the optical disc and detecting reflected light in a photo detector;

an equalize unit for performing equalize adjustment on the RF signal, which is an output from the read unit;

a playback unit for generating a playback signal from the RF signal having undergone the equalize adjustment by the equalize unit and outputting the playback signal;

a parameter storage unit for storing initial values of parameters used for the equalize adjustment by the equalize unit; and a parameter detection unit for detecting a value of at least one parameter at which jitter of the RF signal having undergone the equalize adjustment by the equalize unit becomes optimal during playback of the optical disc set in the main body, wherein:

the equalize unit performs the equalize adjustment using the initial values stored in the parameter storage unit at a beginning of the playback of the optical disc set in the main body, and thereafter performs the equalize adjustment each time the parameter detection unit detects a value of the parameter at which the jitter of the RF signal having undergone the equalized adjustment becomes optimal by using the detected value of the parameter.

3. The optical disc apparatus according to claim 2, wherein:

the parameter detection unit detects a boost amount at which the jitter of the RF signal having undergone the equalize adjustment becomes optimal.

4. The optical disc apparatus according to claim 3, wherein:

the parameter detection unit performs the equalize adjustment using three boost amounts, including a boost amount used for the equalize adjustment at this point in time, a boost amount larger than the firstly-mentioned boost amount by a specific amount, and a boost amount smaller than the firstly-mentioned boost amount by a certain amount, and detects the boost amount at which the jitter reaches minimal as a boost amount to be used for the equalize adjustment.

5. The optical disc apparatus according to claim 3, wherein:

the parameter detection unit suspends processing to detect the boost amount to be used for the equalize adjustment when the detected boost amount to be used for the equalize adjustment is equal to the boost amount that is used for the equalize adjustment at this point in time, and resumes processing to detect a boost amount at which the jitter of the RF signal having undergone the equalize adjustment becomes optimal immediately after the playback of the optical disc starts or contents being played back are switched.

* * * * *